No. 833,614. PATENTED OCT. 16, 1906.
R. E. MIERSWA.
BACKWATER TRAP.
APPLICATION FILED APR. 19, 1906.

Witnesses
J. M. Fowler Jr.
J. H. Crawford

Inventor
Ralph E. Mierswa
By Mason, Fenwick & Lawrence
Attorneys

UNITED STATES PATENT OFFICE.

RALPH E. MIERSWA, OF OSHKOSH, WISCONSIN.

BACKWATER-TRAP.

No. 833,614.  Specification of Letters Patent.  Patented Oct. 16, 1906.

Application filed April 19, 1906. Serial No. 312,732.

*To all whom it may concern:*

Be it known that I, RALPH E. MIERSWA, a citizen of the United States, residing at Oshkosh, in the county of Winnebago and State of Wisconsin, have invented new and useful Improvements in Backwater-Traps, of which the following is a specification.

My invention relates to backwater-traps for sewers; and the objects of my invention are, first, to prevent water from backing into a sewer, and, second, to provide a means of flushing the trap and cleaning the backwater-valve and valve-seat.

In backwater-traps heretofore used the backwater valve or gate has often become clogged by sewage and rendered inoperative.

My invention provides an adequate means of flushing the trap and cleansing the gate or valve and the valve-seat.

Figure 1:
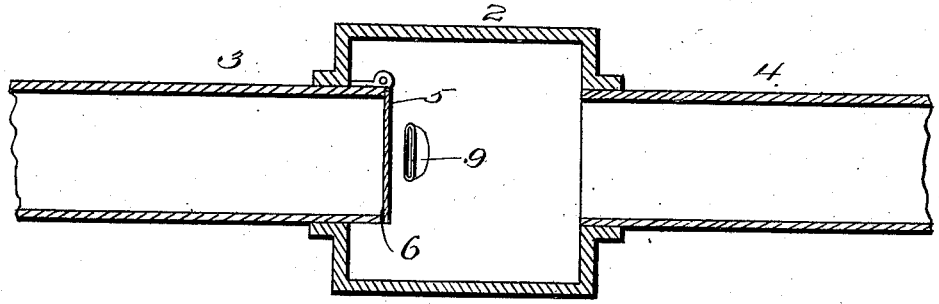
Figure 2:
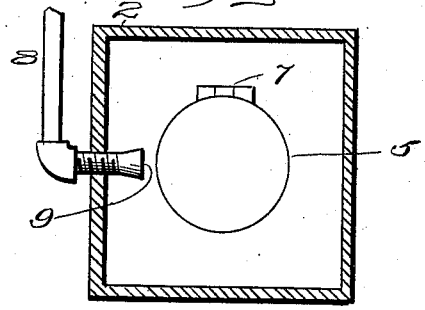
Figure 3:
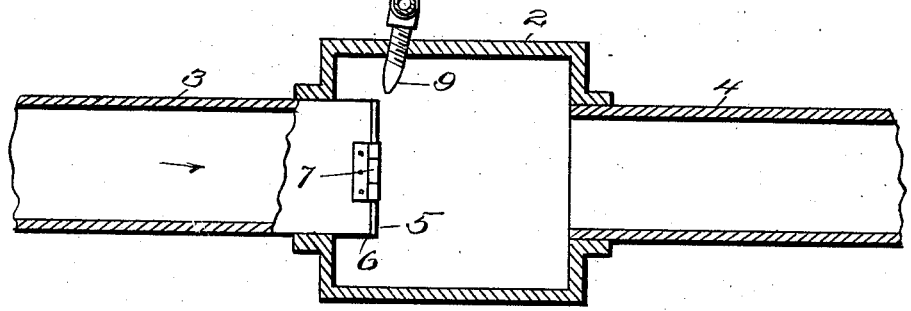
Figure 4:
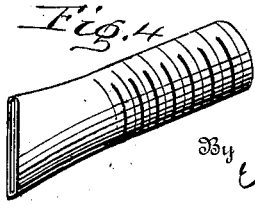

In the accompanying drawings, Figure 1 represents a vertical section longitudinally of the trap. Fig. 2 is a cross-section illustrating a front view of the gate. Fig. 3 represents a top view of the trap with the cover removed. Fig. 4 is a detail perspective view of the fan-stream nozzle.

Referring to the drawings by numerals, 2 represents an inclosed trap.

3 represents the inlet sewer-pipe, and 4 represents the outlet sewer-pipe.

5 represents the backwater gate or valve resting normally upon the valve-seat 6 and hinged from the top at 7. The gate 5 is arranged to operate automatically and to open within the trap to allow the passage of sewage and close when the water or sewage in the outlet-pipe backs up. In the operation of such a trap the sewerage is often retarded and clogs at the bottom around the valve-seat 6 and upon the gate 5, so as to prevent the proper operation of the gate or valve 5.

In my invention I provide a supply of water at a pressure through the pipe 8 and the fan-stream nozzle 9 for the purpose of cleaning the valve or gate 5 and the valve-seat 6. The trap is securely closed upon all sides except at the entry of the inflow-pipe 3 and the opening of the outlet-pipe 4. It is essential that the fan-stream nozzle 9 be located at a point of entry in the side of the trap slightly interior of the perpendicular line of the valve 5 when closed. The fan-stream nozzle throws a perpendicular fan stream of water which if the gate is closed entirely will miss the gate and strike the opposite wall of the trap. If the gate is forced or held open by sewage, the fan stream will split against the edge of the gate and cleanse the gate and the gate-seat of all sewage or foreign matter. The angle of the pipe is slightly inclined toward the line of the gate for this purpose and so that the force of the stream will operate to close the gate. It will be understood that the nozzle 9 throws a perpendicular fan stream which at the point of contact with the gate is of such perpendicular length as to wash the entire gate and also cleanse the gate-seat of all sewage and foreign matter. As soon as the gate is cleansed it drops automatically to its normal position and the stream of water passes by. The flushing apparatus thus described also acts to flush and cleanse the entire trap 2.

Having thus described my invention, what I claim is—

1. In a backwater-trap, the combination with the trap, the inlet-pipe and the outlet-pipe, of an inwardly-swinging inlet-gate hinged at the top and a laterally-arranged water-supply pipe opening into the trap at a point inwardly removed from the perpendicular plane of the gate at its normal position, substantially as shown.

2. In a backwater-trap, the combination with the trap, the inlet-pipe and the outlet-pipe, of an inwardly-swinging top-hung gate and a water-supply pipe having a fan-stream nozzle opening into the side of the trap at a point inwardly removed from the perpendicular plane of the gate at its normal position, substantially as shown.

3. In a backwater-trap, the combination with the trap, the inlet-pipe and the outlet-pipe of an inwardly-swinging inlet-gate hinged at the top to the inlet-pipe and a water-supply pipe opening into the side of the trap at a point slightly inwardly removed from the perpendicular plane of the gate at its normal position, said pipe having a perpendicular fan-stream nozzle and said pipe being inclined slightly toward the gate, substantially as shown.

In testimony whereof I affix my signature in presence of two subscribing witnesses.

RALPH E. MIERSWA.

Witnesses:
WM. B. STICKNEY,
A. R. WATERHOUSE.